United States Patent [19]

Siekmann et al.

[11] Patent Number: 4,657,565
[45] Date of Patent: Apr. 14, 1987

[54] PROCESS FOR THE SEPARATION OF FLUIDS OF DIFFERENT VAPOR PRESSURES

[75] Inventors: Helmut E. Siekmann, Berlin/Zehlendorf; Jürgen Bässler, Dortmund; Winfried Liebig, Iserlohn, all of Fed. Rep. of Germany

[73] Assignees: UHDE GmbH, Dortmund; Helmut E. Siekmann, Berlin, both of Fed. Rep. of Germany

[21] Appl. No.: 761,192

[22] Filed: Jul. 31, 1985

[30] Foreign Application Priority Data

Aug. 2, 1984 [DE] Fed. Rep. of Germany ....... 3428534

[51] Int. Cl.$^4$ .............................................. B01D 19/00
[52] U.S. Cl. ........................................ 55/55; 210/801
[58] Field of Search ................. 55/36, 46, 52, 55, 189, 55/194, 195; 210/718, 800, 801; 203/DIG. 19

[56] References Cited

U.S. PATENT DOCUMENTS 3,163,508 12/1964 Tuck et al. ................................ 55/52
3,344,584 10/1967 Kehoe et al. ............................ 55/46
3,345,803 10/1967 Smith ....................................... 55/55
3,660,285 5/1972 Markel ................................... 210/800
4,002,440 1/1977 Saari ..................................... 55/55 X
4,216,089 8/1980 Boon et al. ............................ 210/718

FOREIGN PATENT DOCUMENTS 0670327 9/1963 Canada .................................. 55/195
0039571 3/1977 Japan .................................... 55/189
0498799 1/1939 United Kingdom .................... 55/55

Primary Examiner—Charles Hart
Attorney, Agent, or Firm—Toren, McGeady and Goldberg

[57] ABSTRACT

A method for generation of cavitation within a flowing liquid, wherein expenditure for equipment for purposeful generation of cavitation and control of the cavitated liquid portion can be achieved by passing the liquid from a high-level reservoir through a downwardly flowing path which includes an outlet nozzle, at least one pipe bend connected to the outlet nozzle and a drop-pipe with a control valve in the vicinity of the lower end of the drop pipe.

4 Claims, 1 Drawing Figure

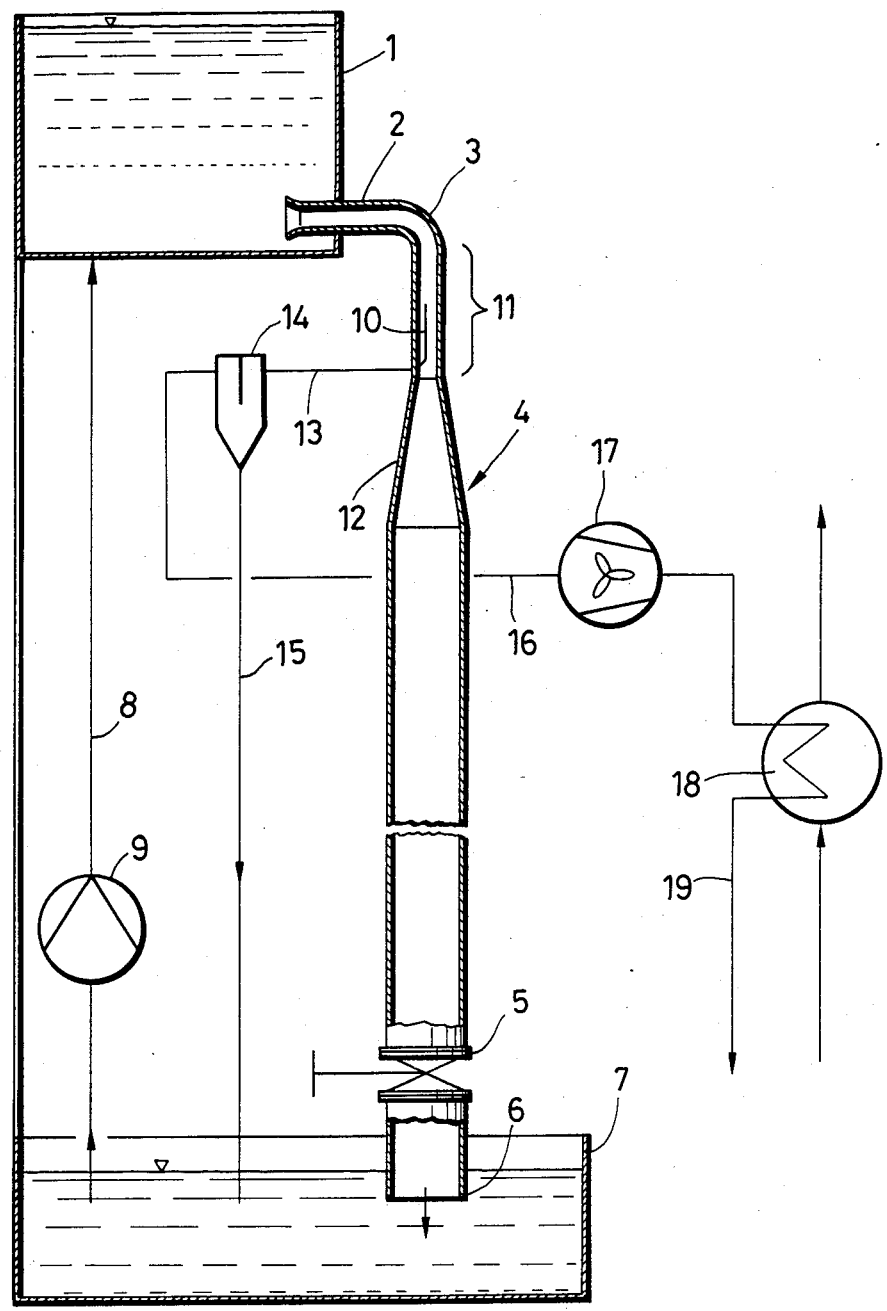

PROCESS FOR THE SEPARATION OF FLUIDS OF DIFFERENT VAPOR PRESSURES

The invention relates to a process and equipment for the removal of readily volatile matter from fluids, in particular for the treatment of waste water.

The boiling point of liquids is strongly dependent on pressure. The boiling temperature drops with decreasing pressure. Under strong vacuum, such as may occur at high velocities, or when ambient pressure drops, pressure can decrease locally to boiling pressure. Such conditions frequently occur in hydrodynamic flow machines, such as pumps, turbines, propellers, for instance when turbine blades are passed, etc. They result in what is known as cavitation. In it, vapor and gas-bubbles are released from the liquid and cause the formation of voids. A subsequent pressure rise is accompanied by rapid collapse of the bubbles, so-called impact condensation (E. Truckenbrodt, "Steuerungsmechanik", Springer Verlag 1968, Page 15 or Dubbel "Taschenbuch für den Maschinenbau", Springer Verlag 1983, Page 893).

Although this phenomenon is in many cases undesirable owing to the possibility of erosion of the material around which flow takes place, and also due to the considerable noise caused by cavitation, it may be usefully applied in other cases, in particular, for instance, as an aid in the destruction of germs in waste water. DE-PS No. 24 55 633 deals with this.

In this known process such an amount of sonic energy is introduced into the water in zones with a sufficient ozone concentration for the destruction of germs that cavitation occurs, permitting the attainment of an increase in the germicidal effects of the ozone in the waste water. The task of the invention is the creation of a solution with which materials of differing vapor pressure figures can be separated.

A method is also known of generating cavitation by means of a cavitator, which can essentially be compared to a centrifuge. This is also a relatively complex and expensive solution.

SUMMARY OF THE INVENTION

The invention provides a solution with which materials of different vapor pressure figures can be separated. In the process, this is achieved by means of the fact that the fluid to be treated is withdrawn from a high-level reservoir, passed through at least one pipe bend and then to to a drop-pipe in such a way that a cavitation zone forms in the flow in areas upstream, within and downstream of the pipe bend, the cavitated partial flow being separated in the cavitation zone and in terms of equipment by means of the fact that the equipment consists of a high-level reservoir, an outlet nozzle preferably in a horizontal position, at least one pipe bend connected to the outlet nozzle and a drop-pipe and a control valve in the vicinity of the end of the drop-pipe.

The object of the invention is to provide a solution which permits separating fluids of different vapor pressure.

In a process of the type defined before, this problem is solved in accordance with the invention in that the fluid to be treated is withdrawn from a high-level reservoir, passed through at least one pipe bend, and then to a drop-pipe in such a way that a cavitation zone is formed in the flow at least in areas within and downstream of the pipe bend, the cavitated partial flow being withdrawn in the cavitation zone.

The use of this process permits the enrichment of the matter of higher partial pressure in the vapor bubbles of the cavitation zone, since vapor pressure in the bubbles is low corresponding to liquid temperature. Separation of cavitation zone from the main flow permits corresponding separation of the fluids.

Various embodiments of the invention are achieved in that the fluids to be treated are passed to a number of cavitation zones installed in series and/or in parallel.

An essential feature of the invention is also the fact that if the flow portion containing the withdrawn and separated fluid is still charged with droplets or forms droplets, it is passed to a droplet separator; also, provision may be made that the vapor phase of the partial flow separated is withdrawn by a vapor compressor and can subsequently be completely or partially condensed in a condenser.

For solving the problem defined before, the invention also relates to equipment comprising a high-level reservoir, an outlet nozzle preferably in a horizontal position, at least one pipe bend connected to the outlet nozzle and a drop-pipe with a control valve in the vicinity of the end of the drop-pipe.

This equipment is comparatively simple, but very effective. Using it, it is in particular possible to control the formation of the cavitation by means of very simple design measures and to adapt it to prevailing requirements. The customary expenditure and complexity for heat exchangers and heating energy, as is necessary in distillation processes for the separation of fluids of different vapor pressures, is not required.

An essential feature of the invention is a design for the equipment featuring mechanisms for withdrawal and/or separation of the cavitated partial flow from the main flow in the vicinity of the drop-pipe downstream of the pipe bend. This measure permits the equipment to be used for a multitude of applications. For instance, the use of these internals can make it possible to withdraw readily volatile matter in the cavitation area, where they are enriched, and to pass them to further processing or disposal. In the same way, such equipment can also be used for the distillation of fluid mixtures, when, for example, chlorinated hydrocarbons with closely adjacent boiling points are to be separated.

The invention also provides for the diameter of the drop-pipe to become larger downstream of the separation internals. In principle, this area could commence at the point where the internals are installed. However, expansion of diameter below this point permits the pressure to be increased purposefully in such a way that the cavitation occurs in the required form.

The invention also provides for the installation in series and/or in parallel of a number of pipe bends with connected drop-sections with separation equipment for the respective cavitated flow portion. Such a succession of pipe bends and drop-sections permits the withdrawal of a whole range of media, or the subjection of a volume of flow to be treated to a very high degree to the respective cavitation areas.

It may also be purposeful to install below the drop-pipe a collecting basin and pump mechanism for return of the liquid to the high-level reservoir. This would be particularly useful where the liquid to be treated is to be subjected several times to cavitation treatment.

The invention also provides for installation of liquid separators and/or vapor compressors and/or condensers for the purpose of further treatment of the cavitated flow portion withdrawn from the main flow, these plant components being selected in particular in accordance with the type of fluids to be treated and the processes to be implemented.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

BRIEF DESCRIPTION OF THE DRAWING

In the drawing:

FIG. 1 illustrates schematically apparatus in accordance with the present invention.

DETAILED DESCRIPTION OF THE PREFERRED EMBODIMENT

Invention is explained in more detail below using the drawing by way of example. The drawing shows in one figure the equipment in accordance with the invention.

In the example shown, a high-level reservoir 1 is equipped with a horizontal outlet nozzle 2, which empties via a pipe bend 3 into a drop-pipe designated as 4.

Drop-pipe 4 is installed in the direction of gravity flow and has a control valve 5 at its lower end. Drop-pipe 4 empties with its extraction opening 6 into a collecting basin 7. From collecting basin 7, a return line 8 leads via a pump 9 to the high-level reservoir 1.

Essential features of the invention are pipe bend 3, and equipment 10 directly downstream of pipe bend 3 in a vertical pipe section, which is intended to represent the cavitation section and which is designated with a bracket 11. Cavitation conditions already exist upstream of pipe bend 3, but separation of the vaporous and liquid partial flow cannot be achieved ahead of the pipe bend, due to the radial pressure drop. Drop-pipe 4 tapers out into a funnel shape downstream of equipment 10, for instance, baffle plates with extraction nozzles. This area has been designated 12.

As already mentioned, equipment 10 is fitted with an exhaust line 13, which empties in the example shown into liquid separator 14. The liquid separated is passed via line 15 to collecting basin 7. The treated vapor are passed in the example shown via line 16 to a vapor compressor 17, thence to a heat exchanger or condenser 18. Condensate discharge is designated 19.

The variants of the invention described naturally can be modified in many respects, without departing from the basic idea. The invention is thus, in particular not restricted to any specific cross-sectional shape, particularly with regard to the pipe bend and drop-pipe. For this purpose, a circular cross-section customary for pipes can be selected, just as can an oval, angular, or polygonal shape. Nor must the bend in the pipe bend necessarily be the same as shown in the illustration. The 90° deflection can be replaced by any deflection ranging from 45° to 135° C. This depends on the process in which the equipment is to be installed, or on the media to be treated.

We claim:

1. Process for the separation of fluids of different vapor pressures, comprising the steps of withdrawing the fluid to be treated from a high-level reservoir, passing said fluid through at least one pipe bend, and then passing said fluid to a drop-pipe in such a way that a cavitation zone is formed at least in areas in the flow upstream, within and downstream of said pipe bend, a cavitated partial flow being withdrawn in said cavitation zone.

2. Process according to claim 1, wherein the liquid to be treated is passed to a number of cavitation zones installed in series and/or in parallel.

3. Process according to claim 1 or 2, wherein the separated partial flow containing a concentrate of readily volatile matter from the fluid separated is passed to a droplet separator.

4. Process according to claim 1, wherein a vaporous partial flow separated from said fluid is withdrawn by a vapor compressor and is subsequently at least partially condensed in a condenser.

* * * * *